(12) United States Patent
Iancu et al.

(10) Patent No.: US 7,158,583 B2
(45) Date of Patent: Jan. 2, 2007

(54) MULTIPLE COMMUNICATION PROTOCOLS WITH COMMON SAMPLING RATE

(75) Inventors: Daniel Iancu, Pleasantville, NY (US); Gary Nacer, Morris Plains, NJ (US); Stuart G. Stanley, East Northport, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 655 days.

(21) Appl. No.: 10/615,902

(22) Filed: Jul. 10, 2003

(65) Prior Publication Data
US 2005/0008098 A1    Jan. 13, 2005

(51) Int. Cl.
*H04L 27/06* (2006.01)

(52) U.S. Cl. ............. 375/316; 455/456.1; 370/329
(58) Field of Classification Search ............. 375/316; 455/456.1; 370/329
See application file for complete search history.

(56) References Cited

U.S. PATENT DOCUMENTS

| | | | |
|---|---|---|---|
| 5,537,435 A | | 7/1996 | Carney et al. |
| 5,657,026 A | * | 8/1997 | Culpepper et al. .......... 342/374 |
| 6,011,785 A | | 1/2000 | Carney et al. |
| 6,016,550 A | * | 1/2000 | Kokkosoulis et al. ........ 713/400 |
| 7,035,201 B1 | * | 4/2006 | Fu et al. ..................... 370/208 |
| 2002/0119754 A1 | * | 8/2002 | Wakutsu et al. ............ 455/67.1 |
| 2003/0050055 A1 | * | 3/2003 | Ting et al. ................... 455/419 |
| 2003/0081569 A1 | * | 5/2003 | Sexton et al. ................ 370/329 |
| 2004/0198381 A1 | * | 10/2004 | Siegel et al. ............. 455/456.1 |
| 2006/0015674 A1 | * | 1/2006 | Murotake ................... 711/101 |

OTHER PUBLICATIONS

Harada, H. et al.: "A new small-size multi-mode and multi-task software radio prototype for future intelligent transport systems," IEEE Vehicular Technology Conference, New York, NY, pp. 2366-2370 (Sep. 2002).

* cited by examiner

*Primary Examiner*—Mohammed Ghayour
*Assistant Examiner*—Leila Malek
(74) *Attorney, Agent, or Firm*—Barnes & Thornburg LLP

(57) ABSTRACT

A radio including a first channel for receiving signals at a first frequency and a second channel for receiving and transmitting signals at a second frequency. A multiplexer connects the first and second channels through an A/D and D/A converter to a digital signal processor. An oscillator is connected to and provides a common sampling frequency to the A/D and D/A converters. The digital signal processor controls the multiplexer and modifies the received digital signals to accommodate for the different carrier frequencies of the channels using the common sampling rate. A frequency synthesizer is connected to the oscillator and provides different frequency signals for the channels. A third channel may be provided for receiving and transmitting signals at a third frequency and is also connected to the multiplexer. The processor is capable of performing communication protocols for at least two of the channels simultaneously.

8 Claims, 2 Drawing Sheets

MULTIPLE COMMUNICATION PROTOCOLS WITH COMMON SAMPLING RATE

BACKGROUND AND SUMMARY OF THE INVENTION

The present invention relates generally to radios and more specifically to radios for executing multiple communication protocols.

Each communication protocol has a separate radio frequency (RF) to intermediate frequency (IF) front end or processing channel, as well as specific sampling rates. This results in additional expense in hardware, PC board space, consumed power and hardware complexity. A typical example is illustrated in FIG. 1, wherein a GPS channel has its front end hardware connected to a digital signal processor (DSP), while a wireless local area network (WLAN) and a Blue Tooth network channel are connected through a multiplexer and shared A/D and D/A converters to the DSP. A frequency synthesizer must provide the appropriate, separate frequencies for the WLAN and Blue Tooth channels and separate frequencies to the A/D and D/A converters depending upon which signal is being transmitted through the multiplexer. The DSP controls the frequency synthesizer, the multiplexer and the A/D and D/A converters depending upon which channel is being processing.

The radio of the present invention includes a first channel for receiving signals at a first frequency and a second channel for receiving and transmitting signals at a second frequency. A multiplexer connects the first and second channels through an A/D and D/A converter to a digital signal processor. An oscillator is connected to and provides a common sampling frequency to the A/D and D/A converters. The digital signal processor controls the multiplexer and modifies the received digital signals to accommodate for the different carrier frequencies of the channels using the common sampling rate. A frequency synthesizer is connected to the oscillator and provides different frequency signals for the channels. A third channel may be provided for receiving and transmitting signals at a third frequency and is also connected to the multiplexer. The processor is capable of performing communication protocols for at least two of the channels simultaneously. While the first channel may be designed to receive GPS signals, the second channel may be designed for receiving one or more of WLAN, Blue Tooth, GSM, GPRS and WCDMA.

The radio may be a software-defined radio. The processor accommodates for the different frequency signals by linear interpolation of the sampling frequency. The linear interpolation for each interpolated sample $Y_n$, at the desired sampling rate $T_0$, is calculated from two samples $X_{n+1}$, $X_n$ at the common sampling rate $T_s$ as:

$$Y_n = X_n + n(T_0 - T_s)/T_s(X_{n+1} - X_n).$$

These and other aspects of the present invention will become apparent from the following detailed description of the invention, when considered in conjunction with accompanying drawings.

DETAILED DESCRIPTION OF THE PREFERRED EMBODIMENTS

The radios of the prior art and the present invention will be described with respect to FIGS. 1 and 2. Those elements having the same structure or a common structure and function will have the same reference number in both of the figures.

Figure 1:
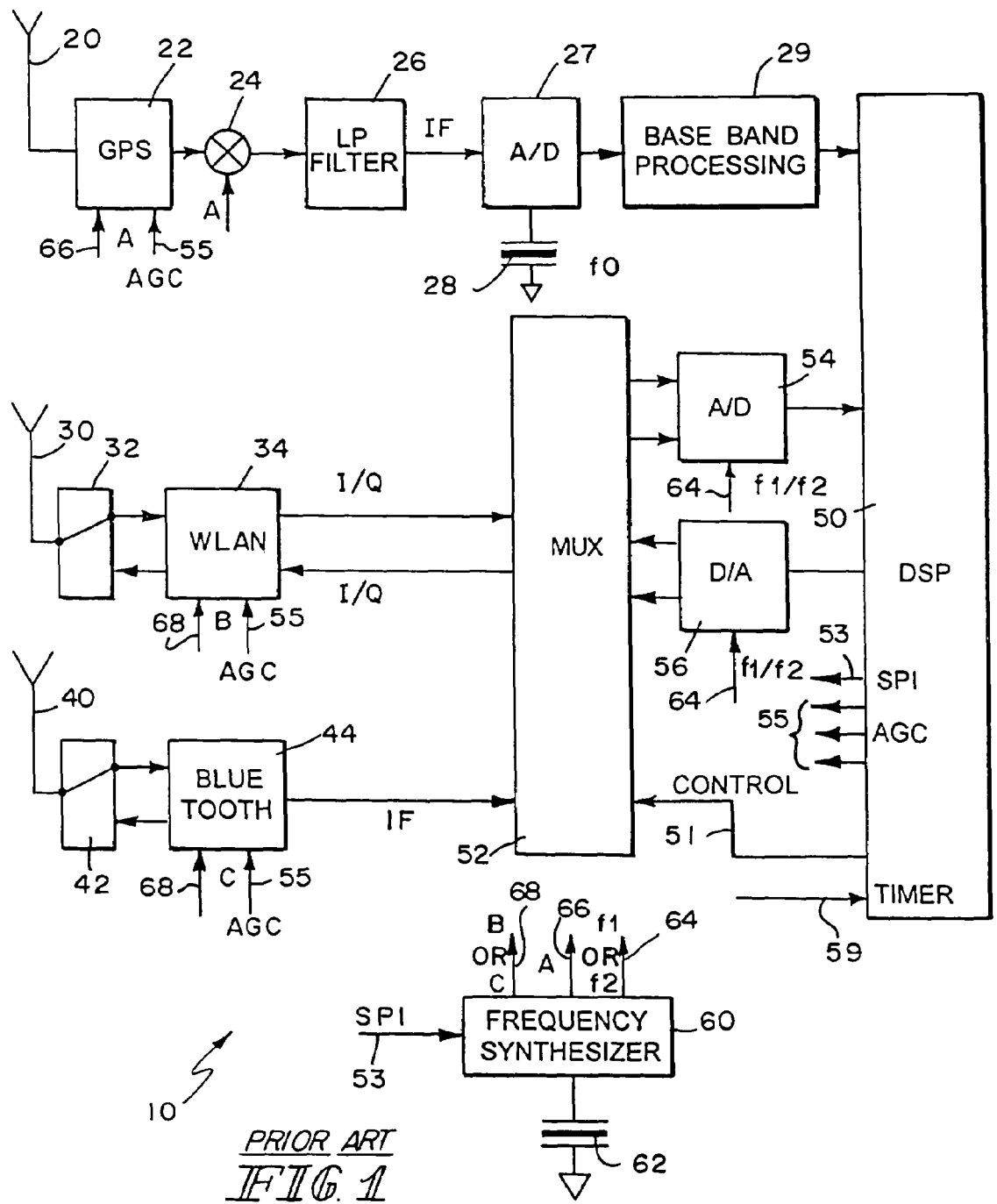
FIG. 1 is a schematic of a radio of the prior art.
Figure 2:
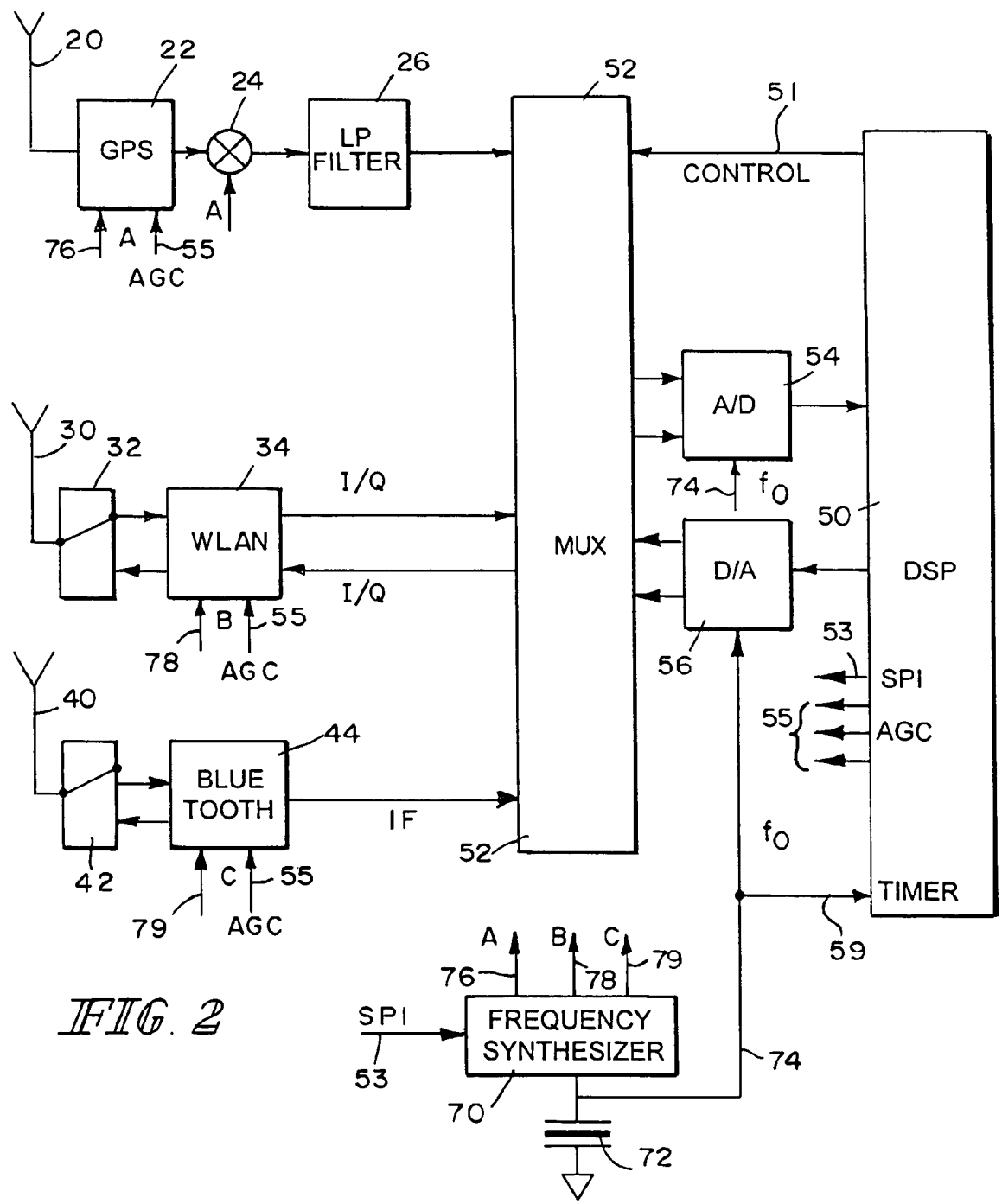
FIG. 2 is a schematic of a radio incorporating the principles of the present invention.

The radio 10 of FIG. 1 (prior art) has three channels for accommodating three communication protocols. The first channel includes an antenna 20 connected to a GPS front end 22. The output is provided through a demodulator 24 and low pass filter 26 to an A/D converter 27 having a crystal oscillator 28 at a base frequency f0. The output of the A/D converter 27 is provided through a base band processor 29 to a digital signal processor (DSP) 50. A second channel includes an antenna 30 with a transmit/receive switch 32 connected to a wireless local area network (WLAN) 34. The output of the WLAN 34 is provided through multiplexer (MUX) 52 to A/D converter 54 whose output is provided to the DSP 50. Transmit signals are provided from the DSP 50 through D/A converter 56 to multiplexer 52, WLAN 34, transmit/receive switch 32 and antenna 30. The third channel includes an antenna 40, a transmit/receive switch 42 and a Blue Tooth front end 44 connected to multiplexer 52. Again, the flow signals from the multiplexer 52 to DSP 50 is controlled by the A/D converter 54 and the D/A converter 56.

The DSP 50 provides a control signal on line 51 to the multiplexer 52. It also provides a control signal (SPI) 53 to a frequency synthesizer 60. Automatic gain control (AGC) signals 55 are provided from the DSP 50 to the GPS front end 52, the WLAN front end 34 and the Blue Tooth front end 44. A timer clock input 59 is provided for the DSP 50.

The frequency synthesizer 60 includes a crystal oscillator 62. Under the control of the SPI signal 53 from the DSP 50, the frequency synthesizer 60 provides a reference signal A at 66 to the GPS front end 22. Depending upon which signal is being processed by the multiplexer 52, synthesizer 60 will either provide a reference frequency B to the WLAN front end 34 on 68 and frequency f1 to the A/D converter 54 and the D/A converter 56 from terminal 64 or the reference frequency C to the Blue Tooth front end 44 and frequency f2 to the A/D converter 54 and the D/A converter 56 from terminal 64.

To reduce the amount of hardware and so as to reduce cost, space, power consumption, etc., the radio of the present invention uses a minimum number of oscillators and A/D converters and simplifies the frequency synthesizer. This is achieved, as illustrated in FIG. 2, by using a common sampling rate. The first channel from antenna 20, GPS front end 22, demodulator 24 and low pass filter 26 is connected to the multiplexer 52. Its output is provided to the DSP 50 through the A/D converter 54. The base band processor 29 is performed in software in the DSP 50. The second channel and the third channel are not changed. The frequency synthesizer is made simpler by merely providing frequency signals A, B, C at terminals 76, 78, 79 to the GPS 22, the WLAN 34 and the Blue Tooth 44, respectively. There is no switching between the frequencies at the respective terminals. Also, the clock or timer 59 to the DSP 50 and the sample frequencies f0 on 74 for the A/D converter 54 and the D/A converter 56 are a common signal.

The DSP 50 modifies the received and transmitted digital signals to accommodate for the different carrier frequencies using the common sampling rate. One simple method of accommodation for the different frequencies is by linear interpolation of the sampling rate. For example, wherein the linear interpolation for each interpolated sample $Y_n$, at the desired sampling rate $T_0$, is calculated from two samples $X_{n+1}$, $X_n$ at the common sampling rate $T_s$ as:

$$Y_n = X_n + n(T_0 - T_s)/T_s(X_{n+1} - X_n).$$

More complex interpolators can be used if there is enough processing power in the DSP 50.

As an example, the crystal 72 may have an oscillation frequency of 32.768 MHz which is typical for GPS. The WLAN carrier frequency may be 33 MHz, and the Blue Tooth may be 32 MHz. Thus, the DSP 50 itself would not modify the GPS digital information, but it would modify that for the other two channels based on the higher or lower carrier frequency and the sampling frequency. Although the frequency of the channel in the middle of the three channels was used as the sampling frequency, any of the other frequencies may be used. Also, a fourth frequency may be used such that all three of the channels are modified in the DSP.

One processor which is capable of performing these operations is a multi-thread DSP SB9600 available from Sandbridge Technologies, Inc. The DSP 50 is capable of executing at least two of the protocols simultaneously. For example, the GPS signal may be processed simultaneously with the WLAN signal or the Blue Tooth signal. Although three channels or three protocol processing is illustrated in FIG. 2, the concept of the present invention may be used with two channels or more than three channels. Also, the given protocol of the channels may include other protocols than those illustrated in the examples used herein to explain the invention. These could include, but not be limited to, GSM, GPRS and WCDMA.

Although the present invention has been described and illustrated in detail, it is to be clearly understood that this is done by way of illustration and example only and is not to be taken by way of limitation. The scope of the present invention is to be limited only by the terms of the appended claims.

What is claimed:

1. A radio comprising:
   a first channel for receiving signals at a first carrier frequency;
   a second channel for receiving and transmitting signals at a second carrier frequency;
   a multiplexer connected to the first and second channels;
   an A/D converter and a D/A converter connecting the channels through the multiplexer to a digital signal processor;
   an oscillator connected to and providing a common sampling rate to the A/D and D/A converters;
   the digital signal processor controlling the multiplexer and modifying received and transmitted digital signals using the common sampling rate to accommodate for the different carrier frequencies by linear interpolation of the sampling rate; and
   wherein the linear interpolation for each interpolated sample $Y_n$, at the desired sampling rate $T_0$, is calculated from two samples $X_{n+1}$, $X_n$ at the common sampling rate $T_s$ as:

$$Y_n = X_n + n(T_0 - T_s)/T_s(X_{n+1} - X_n)$$

where n is an integer.

2. The radio according to claim 1, including a frequency synthesizer connected to the oscillator and providing different frequency signals to the first and second channels.

3. The radio according to claim 1, including a third channel for receiving and transmitting signals at a third carrier frequency and connected to the multiplexer.

4. The radio according to claim 3, including a frequency synthesizer connected to the oscillator and providing different frequency signals to the first, second and third channels.

5. The radio according to claim 3, wherein the processor performs communication protocols for at least two of the channels simultaneously.

6. The radio according to claim 1, wherein the processor performs communication protocols for the first and second channels simultaneously.

7. The radio according to claim 1, wherein the first channel is designed to receive GPS signals, and the second channel is designed to receive signals from the group of WLAN, Blue Tooth, GSM, GPRS and WCDMA.

8. The radio according to claim 1, wherein the radio is a software-defined radio.

* * * * *